(12) United States Patent
Kim (10) Patent No.: US 10,067,663 B2
(45) Date of Patent: Sep. 4, 2018

(54) SYSTEM AND METHOD FOR SETTING A THREE-DIMENSIONAL EFFECT

(71) Applicant: HYUNDAI MOTOR COMPANY, Seoul (KR)

(72) Inventor: Ju Hyuk Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 188 days.

(21) Appl. No.: 15/191,178

(22) Filed: Jun. 23, 2016

(65) Prior Publication Data

US 2017/0160915 A1    Jun. 8, 2017

(30) Foreign Application Priority Data

Dec. 3, 2015    (KR) .................. 10-2015-0171676

(51) Int. Cl.

| | | |
|---|---|---|
| *G06F 3/048* | (2013.01) | |
| *G06F 3/0484* | (2013.01) | |
| *B60K 37/02* | (2006.01) | |
| *G06F 3/0482* | (2013.01) | |
| *H04N 5/232* | (2006.01) | |
| *B60N 2/02* | (2006.01) | |
| *H04N 13/02* | (2006.01) | |

(52) U.S. Cl.
CPC .......... *G06F 3/04847* (2013.01); *B60K 37/02* (2013.01); *B60N 2/02* (2013.01); *G06F 3/0482* (2013.01); *H04N 5/232* (2013.01); *B60K 2350/1008* (2013.01); *B60K 2350/1064* (2013.01); *B60K 2350/2017* (2013.01); *B60K 2350/352* (2013.01); *H04N 13/0285* (2013.01)

(58) Field of Classification Search
CPC ... G06F 3/00; G06F 3/02; G06F 3/048; G06F 3/0481; G06F 3/0482; G06F 3/0484; G06F 3/04847; G06T 17/00; G07C 5/00; B06K 37/02; H04N 5/232; H04N 2350/352; H04N 2350/1008; H04N 2350/1064; H04N 2350/2017
See application file for complete search history.

(56) References Cited

U.S. PATENT DOCUMENTS

| | | | |
|---|---|---|---|
| 7,537,354 B2 | 5/2009 | Kato | |
| 2013/0106995 A1* | 5/2013 | Jeon .................. | B60K 37/06 348/43 |
| 2013/0314321 A1 | 11/2013 | Deom et al. | |
| 2014/0309813 A1* | 10/2014 | Ricci .................. | B60Q 1/00 701/2 |
| 2015/0081167 A1* | 3/2015 | Pisz .................. | B60H 1/00642 701/36 |

(Continued)

FOREIGN PATENT DOCUMENTS

| | | | |
|---|---|---|---|
| JP | 2005-119465 A | 5/2005 | |
| KR | 10-2006-0020438 A | 3/2006 | |

(Continued)

*Primary Examiner* — Xiomar L Bautista
(74) *Attorney, Agent, or Firm* — McDermott Will & Emery LLP (57) ABSTRACT

A system for setting a three-dimensional (3D) effect includes a memory seat for transmitting and receiving memory seat information of a driver and a 3D cluster for matching the memory seat information and 3D effect setting information and allowing the driver to set the 3D effect or set a two-dimension (2D) mode.

10 Claims, 6 Drawing Sheets

(56) References Cited

U.S. PATENT DOCUMENTS

2015/0178985 A1 6/2015 Di Censo et al.
2017/0161576 A1* 6/2017 Banno ................ G06K 9/00845

FOREIGN PATENT DOCUMENTS

| KR | 10-2012-0051550 A | 5/2012 |
| KR | 10-2012-0067219 A | 6/2012 |
| KR | 10-2013-0054032 A | 5/2013 |
| KR | 10-2013-0110798 A | 10/2013 |
| KR | 10-2014-0008216 A | 1/2014 |
| KR | 10-2014-0075985 A | 6/2014 |

* cited by examiner

SYSTEM AND METHOD FOR SETTING A THREE-DIMENSIONAL EFFECT

CROSS-REFERENCE TO RELATED APPLICATION

This application claims the benefit of priority to Korean Patent Application No. 10-2015-0171676, filed on Dec. 3, 2015 with the Korean Intellectual Property Office, the disclosure of which is incorporated herein in its entirety by reference.

TECHNICAL FIELD

The present disclosure relates to a system and a method for setting a three-dimensional effect, and more particularly, to a system and a method for setting a three-dimensional effect using a three-dimensional cluster and a memory seat.

BACKGROUND

In accordance with a recent increase in a demand of stereo three-dimensional (3D) content, research into stereo 3D content intended for various applications is actively conducted. Visualization examples to which a stereo rendering may be applied as a method in which a virtual structure may be observed in a state of immersion exist also in modeling tools such as Maya, 3D MAX, or Rhino.

The stereo 3D content may refer to a principle in which images corresponding to left and right sights are projected using a binocular cure of a human to allow the human to feel a 3D effect and a depth effect.

Therefore, in a stereo rendering, two cameras may be disposed in a virtual space similarly to both eyes of a human to obtain the image, and the image may be induced to be formed on a retina of each eyeball, thereby allowing a driver to feel the depth effect. Since the stereo image is different from a real world recognized by the human in a method and a process of obtaining the image, the human also shows symptoms such as visual fatigue, vertigo, and the like.

Research into various approaches for reducing visual fatigue occurring from the stereo 3D content has been proposed.

SUMMARY

The present disclosure has been made to solve the above-mentioned problems occurring in the prior art while advantages achieved by the prior art are maintained intact.

An aspect of the present disclosure provides a system and a method for setting a three-dimensional (3D) effect capable of directly setting the 3D effect or a two-dimension (2D) desired by a driver in a 3D cluster, or providing the 3D effect or 2D information to the driver by automatically interfacing the 3D cluster with a memory seat.

Other objects and advantages of the present disclosure can be appreciated by the following description and will be clearly described by the exemplary embodiments of the present disclosure. It will be easily known that the objects and advantages of the present disclosure can be implemented by means and a combination thereof shown in the appended claims.

According to an exemplary embodiment of the present disclosure, a system for setting a three-dimensional (3D) effect may include a memory seat for transmitting and receiving memory seat information of a driver; and a 3D cluster for matching the memory seat information and 3D effect setting information and allowing the driver to set the 3D effect or set a two-dimension (2D) mode.

The 3D cluster may include a camera, a 3D panel, a controller, a memory, and a CAN communication section.

When the driver sets 3D effect information of the 3D cluster, the memory may match the memory seat information received from the memory seat and the 3D effect information set by the driver, and store or update the matched result.

The 3D effect may be set using a driver setting menu provided in the 3D cluster.

The driver setting menu may include a 3D effect setting menu, a trip computer menu, a consumable part period menu, and a vehicle setting menu, and the 3D effect setting menu may include a speedometer, a tachometer, a central information region, a tap menu, a fuel and water temperature gauge, a 3D effect initialization menu of an entire region, and a 3D effect removal menu of the entire region, among 3D effect setting targets.

According to an exemplary embodiment of the present disclosure, a method for setting a three-dimensional (3D) effect may include when an ignition of a vehicle is turned on, retrieving, by a system for setting a 3D effect, memory seat information received from a memory seat; when the retrieved memory seat information is a first memory seat state, setting a stored 3D effect of a first driver; when the 3D effect is again arbitrarily set, determining a current memory seat state; and when the current memory seat state is the first memory seat state, matching the first memory seat state and a changed 3D effect and storing the matched result.

The retrieving of the memory seat information may include determining whether or not the memory seat is the first memory seat state, a second memory seat state, or a non-setting state.

The method may further include, when the 3D effect is not again arbitrarily set, maintaining an existing 3D effect.

The method may further include: when the retrieved memory seat information is a second memory seat state, setting a stored 3D effect of a second driver; when the 3D effect is again arbitrarily set, determining a current memory seat state; and when the current memory seat state is the second memory seat state, matching the second memory seat state and the changed 3D effect and storing the matched result.

The method may further include: when the retrieved memory seat information is a non-setting state, determining whether or not the 3D effect is again arbitrarily set; and changing the 3D effect or maintaining an existing 3D effect.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Advantages and features of the present disclosure and methods to achieve them will be described from exemplary embodiments described below in detail with reference to the accompanying drawings. However, the present disclosure is not limited to the exemplary embodiments set forth herein, but may be modified in many different forms. The exemplary embodiments of the present disclosure will be provided to describe the spirit of the present disclosure in detail so that those skilled in the art may easily implement the spirit of the present disclosure.

In the drawings, exemplary embodiments of the present disclosure are not limited to illustrated specific forms, but may be exaggerated for clarity. In the present specification, specific terms have been used, but are only used for the purpose of describing the present disclosure and are not used for qualifying the meaning or limiting the scope of the present disclosure.

In the present specification, an expression 'and/or' is used as a meaning including at least one of components listed before and after the expression. In addition, an expression 'connected to or coupled to' is used as a meaning including a case in which one component is directly connected to another component or is indirectly connected through another component. Unless explicitly described to the contrary, a singular form includes a plural form in the present specification. In addition, components, steps, operations, and elements mentioned by 'comprise' or 'comprising' used in the present specification mean the existence or addition of one or more other components, steps, operations, and elements.

Hereinafter, exemplary embodiments of the present disclosure will be described in detail with reference to the accompanying drawings.

Figure 1:
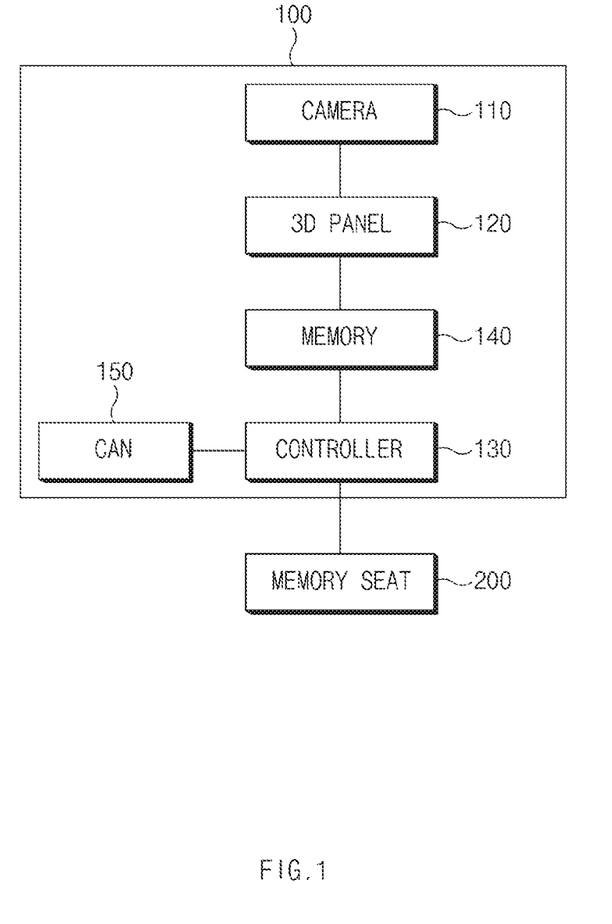
FIG. 1 is a configuration diagram illustrating a system for setting a three-dimensional (3D) effect according to an exemplary embodiment of the present disclosure.

FIG. 1 is a configuration diagram illustrating a system for setting a three-dimensional (3D) effect according to an exemplary embodiment of the present disclosure.

Referring to FIG. 1, the system for setting a 3D effect may include a 3D cluster 100 and a memory seat 200.

The 3D cluster 100 may include a camera 110, a 3D panel 120, a controller 130, a memory 140 and a CAN communication section 150.

The camera 110 may photograph a face and an eye of a driver.

The 3D panel 120 may be a panel on which, or at which, a barrier is formed on a TFT-LCD (a display LCD).

Here, the display LCD may be a screen for outputting a photographed image, and the barrier may be a liquid crystal covering one image so that both eyes of the driver may view different images and adjust a 3D effect such as a 3D image.

The controller 130 may control the display LCD and the barrier of the 3D cluster 100.

Specifically, the controller 130 may detect locations of the face and the eye of the driver received from the camera 110, and control the barrier according to the detected positions of the face and the eye of the driver.

When the driver sets 3D effect information of the 3D cluster 100, the memory 140 may match and store memory seat information received from the memory seat 200 and 3D effect information set by the driver.

The CAN communication section 150 may transmit and receive the memory seat information and the 3D effect information between the 3D cluster 100 and the memory seat 200.

The memory seat 200 may be interfaced with the 3D cluster 100 and may be a seat on which the driver may sit in a vehicle. When the 3D effect is set in the 3D cluster 100, the memory seat 200 may transmit and receive various memory seat information of the driver with the 3D cluster 100, and may store and update the memory seat information.

Figure 2:
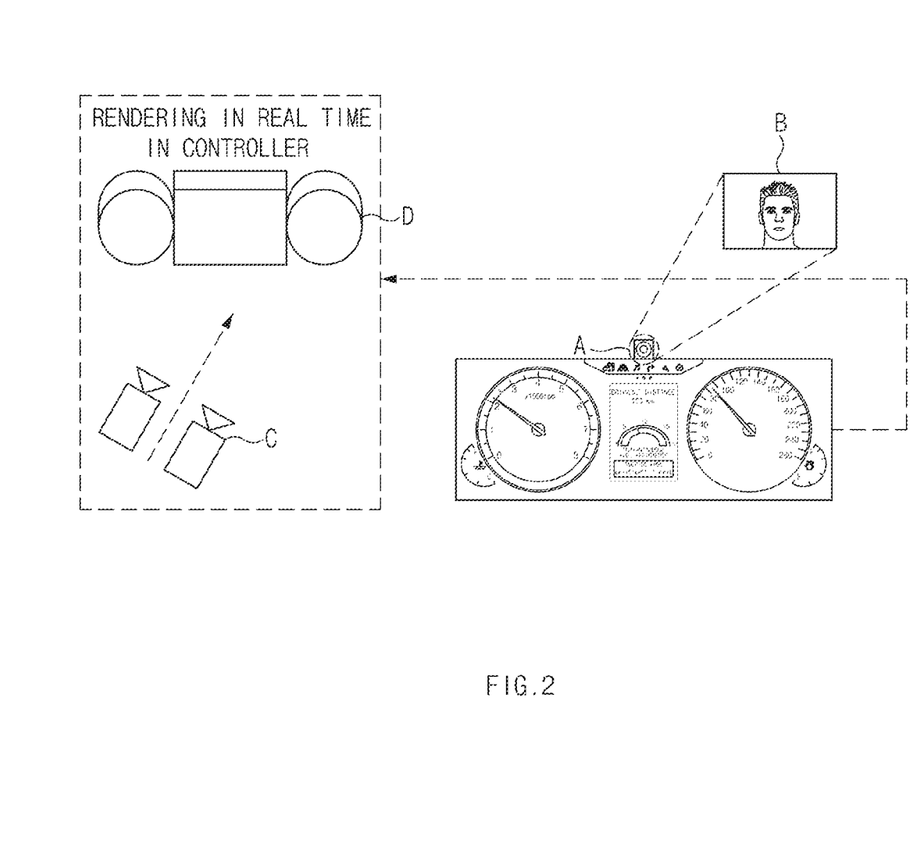
FIG. 2 is a view schematically illustrating a method for rendering an object based on a location variable camera of a 3D cluster according to an exemplary embodiment of the present disclosure.

FIG. 2 is a view schematically illustrating a method for rendering an object based on a location variable camera of a 3D cluster according to an exemplary embodiment of the present disclosure.

Referring to FIG. 2, the controller of the system for setting a 3D effect may change a position of a virtual camera C that performs a rendering in real time depending on the position B of the face and the eye of the driver received from the camera A, and render a 3D object D in real time at the same point of sight of a virtual camera as the position of the face and the eye of the driver.

The controller 130 of the system for setting a 3D effect may render the 3D object D in real time at the point of sight of the virtual camera depending on the position of the face and the eye of the driver, thereby making it possible to minimize an awareness of difference of the image felt by the driver.

Figure 3:
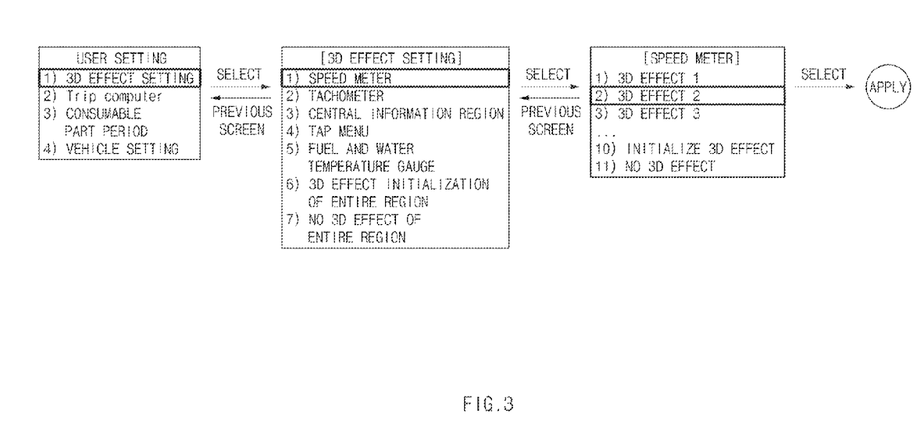
FIGS. 3 and 4 are views illustrating a method for setting a 3D effect using a driver setting menu of the 3D cluster according to an exemplary embodiment of the present disclosure.
Figure 4:
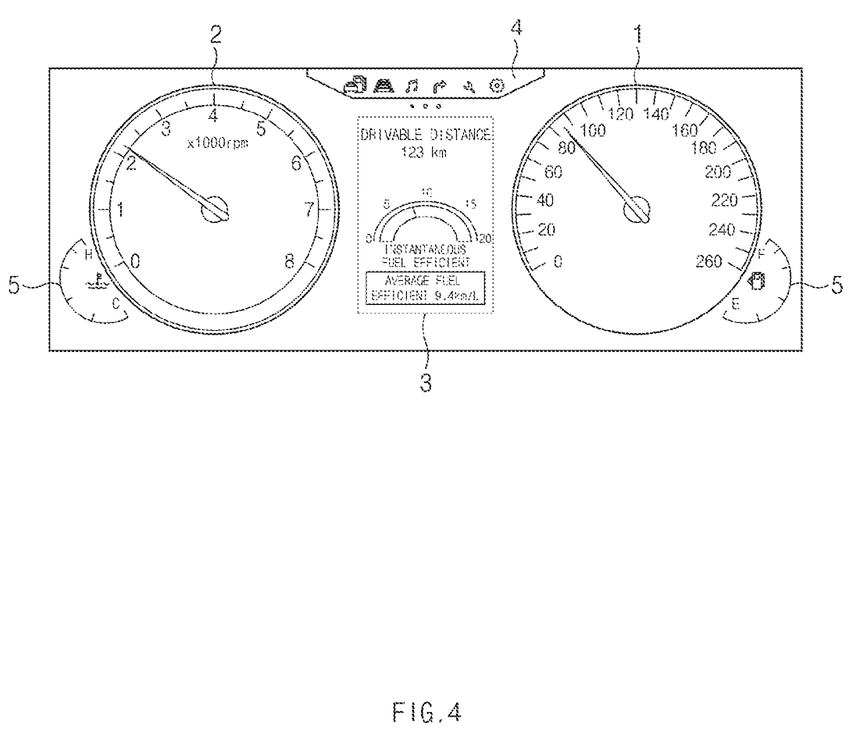

FIGS. 3 and 4 are views illustrating a method for setting a 3D effect using a driver setting menu of a 3D cluster according to an exemplary embodiment of the present disclosure.

Referring to FIGS. 3 and 4, the driver may perform a driver setting using the display LCD of a 3D panel in the vehicle.

Specifically, the driver may set the 3D effect using a driver setting menu provided in the 3D cluster.

Here, the driver setting menu may include a 3D effect setting menu, a trip computer menu, a consumable part period menu, a vehicle setting menu, and the like.

Further, the 3D effect setting menu may include a speed meter (1), a tachometer (2), a central information region (3), a tap menu (4), a fuel and water temperature gauge (5), a 3D effect initialization of an entire region and a 3D effect removal of the entire region, among 3D effect setting targets (see FIG. 4).

Here, other functions may be added to the 3D effect setting menu or the 3D effect setting menu may be changed, the 3D effect initialization of the entire region may be referred to as being initialized so as to be restored to a basic value at the time of releasing the vehicle, and the 3D effect removal of the entire region may be referred to as removing the 3D effect for the entire region of the 3D cluster and switching into the 2D mode.

Next, when the 3D effect setting target (e.g., the speed meter) is selected from the 3D effect setting menu, a 3D effect kind menu may be selected.

Here, the 3D effect kind menu may be classified into a first 3D effect to a ninth 3D effect depending on a 3D effect reference (degree), and may also include an initialization of the 3D effect and no 3D effect.

The 3D effect kind menu may be added or changed by the driver.

Figure 5:
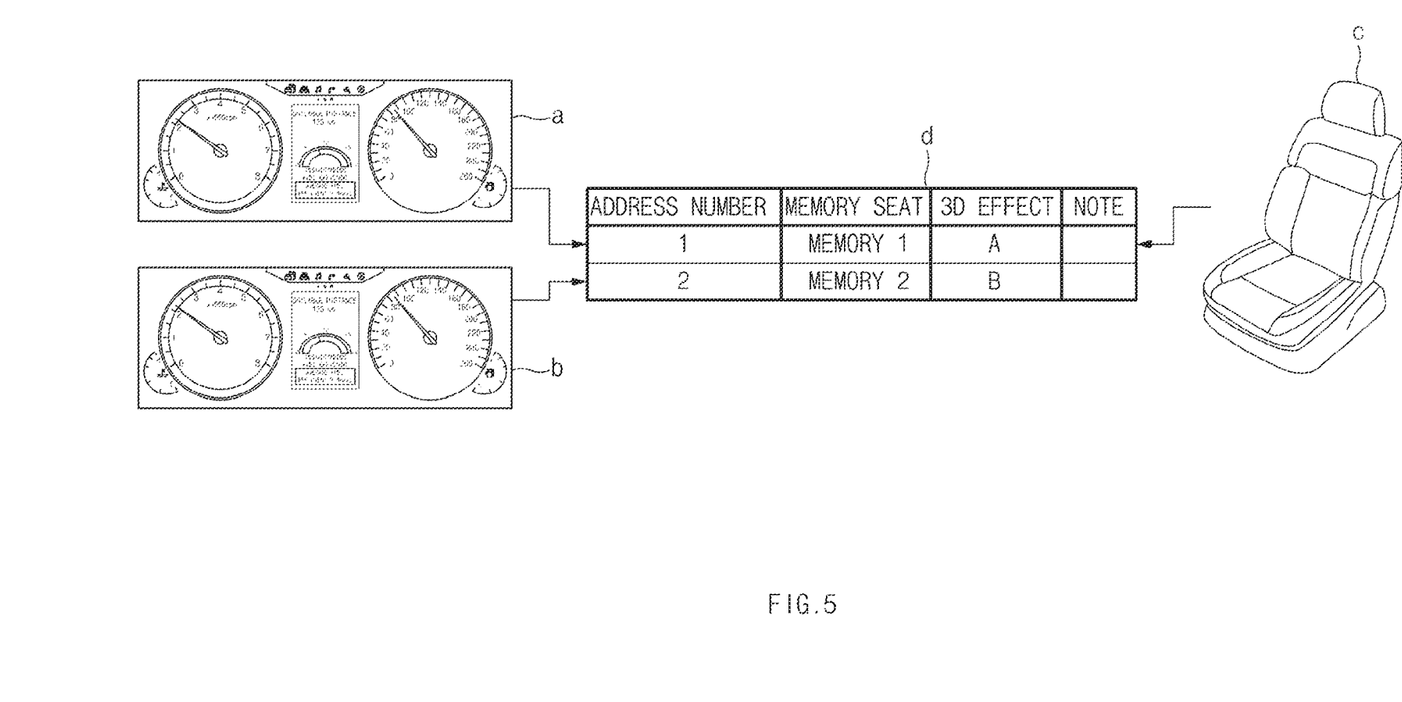
FIG. 5 is a view schematically illustrating a method for setting a 3D effect of a system for setting a 3D effect according to an exemplary embodiment of the present disclosure.

FIG. 5 is a view schematically illustrating a method for setting a 3D effect of a system for setting a 3D effect according to an exemplary embodiment of the present disclosure.

Referring to FIG. 5, the driver may set the 3D effect using the driver setting menu provided in the 3D cluster.

Next, the system for setting a 3D effect may receive information from the memory seat at the time of storing the set 3D effect in the memory of the 3D cluster.

Next, the system for setting a 3D effect may match first and second memory seat information and the 3D effect setting information, and store the information.

For example, when a first driver sets a 3D effect A, the 3D effect A may be matched to the first memory seat information and may be automatically stored, and when a second driver sets a 3D effect B, the 3D effect B may be matched to the second memory seat information and may be automatically stored.

That is, the system for setting a 3D effect may store the 3D effect for a current driver, and may store the 3D effect for another driver.

Here, the system for setting a 3D effect may interface the 3D clusters a and b and the memory seat c with each other, wherein when the 3D effect of the 3D cluster set by the driver is changed, the 3D clusters may be interfaced with the memory seat to be changed even though they are not reset every time.

Specifically, when the first driver arbitrarily sets the 3D effect, this value may be stored in a memory d in the 3D cluster, and information of a current memory seat may be received and matched to the 3D effect setting information to thereby be automatically stored.

If an information value of the current memory seat is in a non-setting state, the 3D effect may be changed, but a current state may be maintained until next information of the memory seat is input.

Here, the non-setting state of the information value of the memory seat may mean a state in which after an electric seat is adjusted, the adjustment is not stored in the memory seat.

Figure 6:
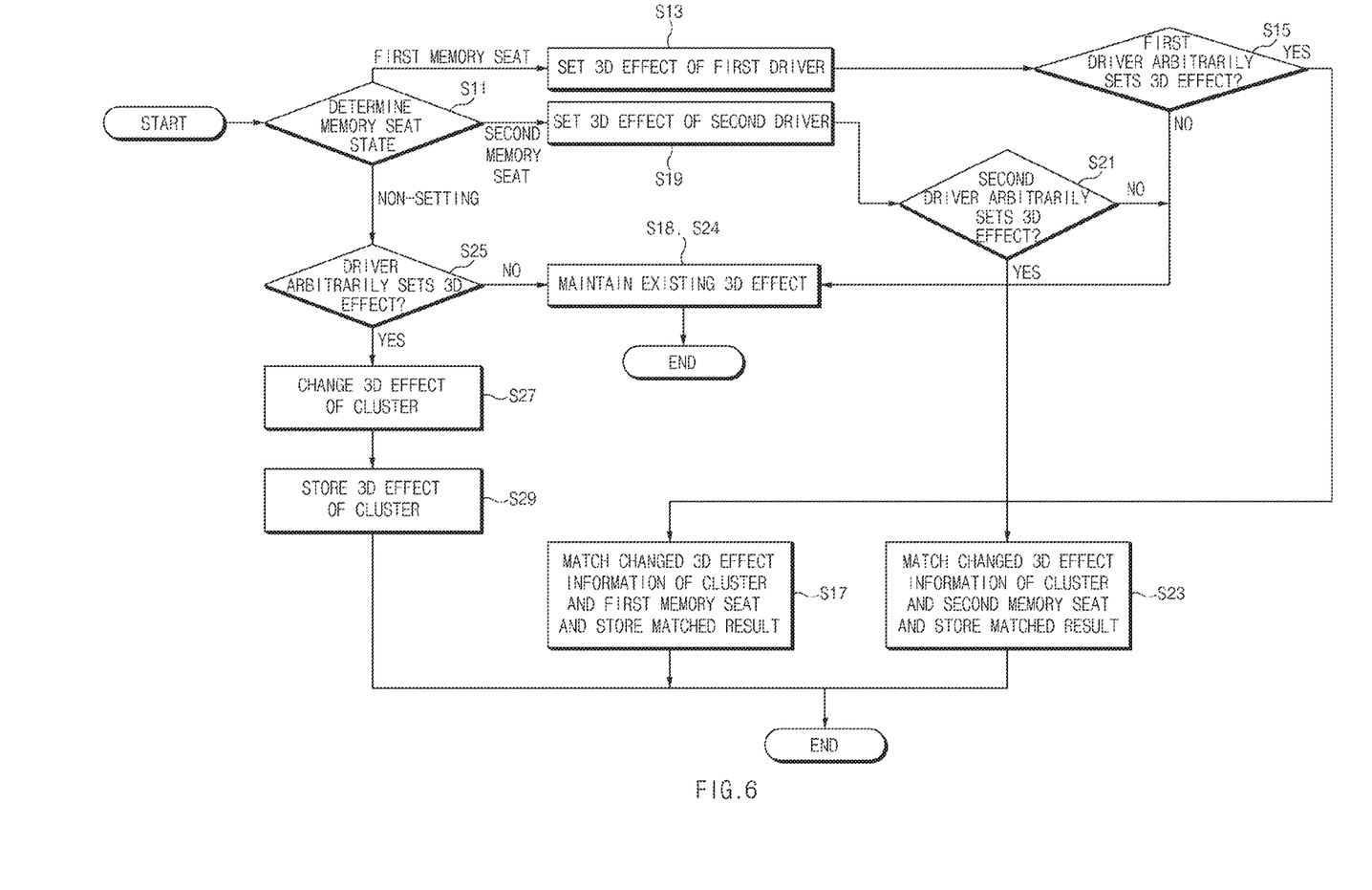
FIG. 6 is a flowchart illustrating a method for setting a 3D effect of a system for setting a 3D effect according to an exemplary embodiment of the present disclosure.

FIG. 6 is a flowchart illustrating a method for setting a 3D effect of a system for setting a 3D effect according to an exemplary embodiment of the present disclosure.

Referring to FIG. 6, when an ignition of a vehicle is turned on, the system for setting a 3D effect may retrieve memory seat information.

That is, the system for setting a 3D effect may determine whether or not the memory seat is a first memory seat state, a second memory seat state or a non-setting state (S11).

Next, if the memory seat information retrieved by the system for setting a 3D effect is the first memory seat state, a stored 3D effect of a first driver may be set (S13).

Next, if the first driver again arbitrarily sets the 3D effect, the system for setting a 3D effect may determine a current memory seat state (S15).

Next, if the current memory seat state determined by the system for setting a 3D effect is the first memory seat state, the first memory seat state and a changed 3D effect may be matched and stored (S17).

However, in S15, if the first driver does not again arbitrarily set the 3D effect, an existing 3D effect may be maintained (S18).

Next, in S11, if the memory seat information retrieved by the system for setting a 3D effect is the second memory seat state, a stored 3D effect of a second driver may be set (S19).

Next, if the second driver again arbitrarily sets the 3D effect, the system for setting a 3D effect may determine a current memory seat state (S21).

Next, if the current memory seat state determined by the system for setting a 3D effect is the second memory seat state, the second memory seat state and a changed 3D effect may be matched and stored (S23).

However, in S21, if the second driver does not again arbitrarily set the 3D effect, an existing 3D effect may be maintained (S18, S24).

In addition, in S11, if the memory seat information retrieved by the system for setting a 3D effect is the non-setting state, it may be determined whether or not the driver again arbitrarily sets the 3D effect (S25).

Next, if the driver changes the 3D effect of the 3D cluster, the system for setting a 3D effect may store the current memory seat state in the memory of the 3D cluster (S27 to S29).

As described above, according to exemplary embodiments of the present disclosure, the setting for the 3D effect desired by the driver is freely executed, thereby making it possible to satisfy needs of a customer.

Further, the 3D effect of the 3D cluster may be initialized, thereby making it possible to provide convenience to the driver.

Further, the 3D mode and the 2D mode of the 3D cluster may be freely switched.

Further, the 3D cluster may be interfaced with the memory seat, there by making it possible to provide the 3D effect suitable for the driver.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for setting a three-dimensional (3D) effect, the system comprising:
   a memory seat for transmitting memory seat information of a user; and
   a 3D cluster for matching the memory seat information of the user and 3D effect setting information, which is set by the user, and for displaying one or more 3D effect setting targets in a 3D mode based on the 3D effect setting information matched with the memory seat information,
   wherein the 3D cluster includes:
      a controller configured to detect a location of the user, based on an image taken by a camera, and to control a 3D panel based on the detected location; and
      a communication device configured to receive the memory seat information.

2. The system according to claim 1, wherein the 3D cluster further includes a 3D panel and a memory.

3. The system according to claim 2, wherein when the user sets the 3D effect setting information of the 3D cluster, the memory matches the memory seat information received from the memory seat and the 3D effect setting information set by the user, and stores or updates the matched result.

4. The system according to claim 1, wherein the 3D effect setting information is set using a user setting menu provided in the 3D cluster.

5. The system according to claim 4, wherein the user setting menu includes a 3D effect setting menu, a trip computer menu, a consumable part period menu, and a vehicle setting menu, and
   the 3D effect setting menu includes a speedometer, a tachometer, a central information region, a tap menu, a fuel and water temperature gauge, a 3D effect initialization menu of an entire region, and a 3D effect removal menu of the entire region, among the one or more 3D effect setting targets.

6. A method for setting a three-dimensional (3D) effect, the method comprising:
when an ignition of a vehicle is turned on, retrieving, by a controller, memory seat information received from a memory seat;
when the retrieved memory seat information is a first memory seat state, setting, by the controller, a stored 3D effect of a first user;
when the 3D effect is again arbitrarily set, determining, by the controller, a current memory seat state;
when the current memory seat state is the first memory seat state, matching, by the controller, the first memory seat state and a changed 3D effect and storing the matched result; and
displaying one or more 3D effect setting targets in a 3D mode, based on the 3D effect setting information matched with the memory seat information.

7. The method according to claim 6, wherein the retrieving of the memory seat information includes determining whether or not the memory seat is the first memory seat state, a second memory seat state, or a non-setting state.

8. The method according to claim 6, further comprising, when the 3D effect is not again arbitrarily set, maintaining an existing 3D effect.

9. The method according to claim 6, further comprising:
when the retrieved memory seat information is a second memory seat state, setting a stored 3D effect of a second user;
when the 3D effect is again arbitrarily set, determining a current memory seat state; and
when the current memory seat state is the second memory seat state, matching the second memory seat state and the changed 3D effect and storing the matched result.

10. The method according to claim 6, further comprising:
when the retrieved memory seat information is a non-setting state,
determining whether or not the 3D effect is again arbitrarily set; and
changing the 3D effect or maintaining an existing 3D effect.

* * * * *